Patented Nov. 15, 1927.

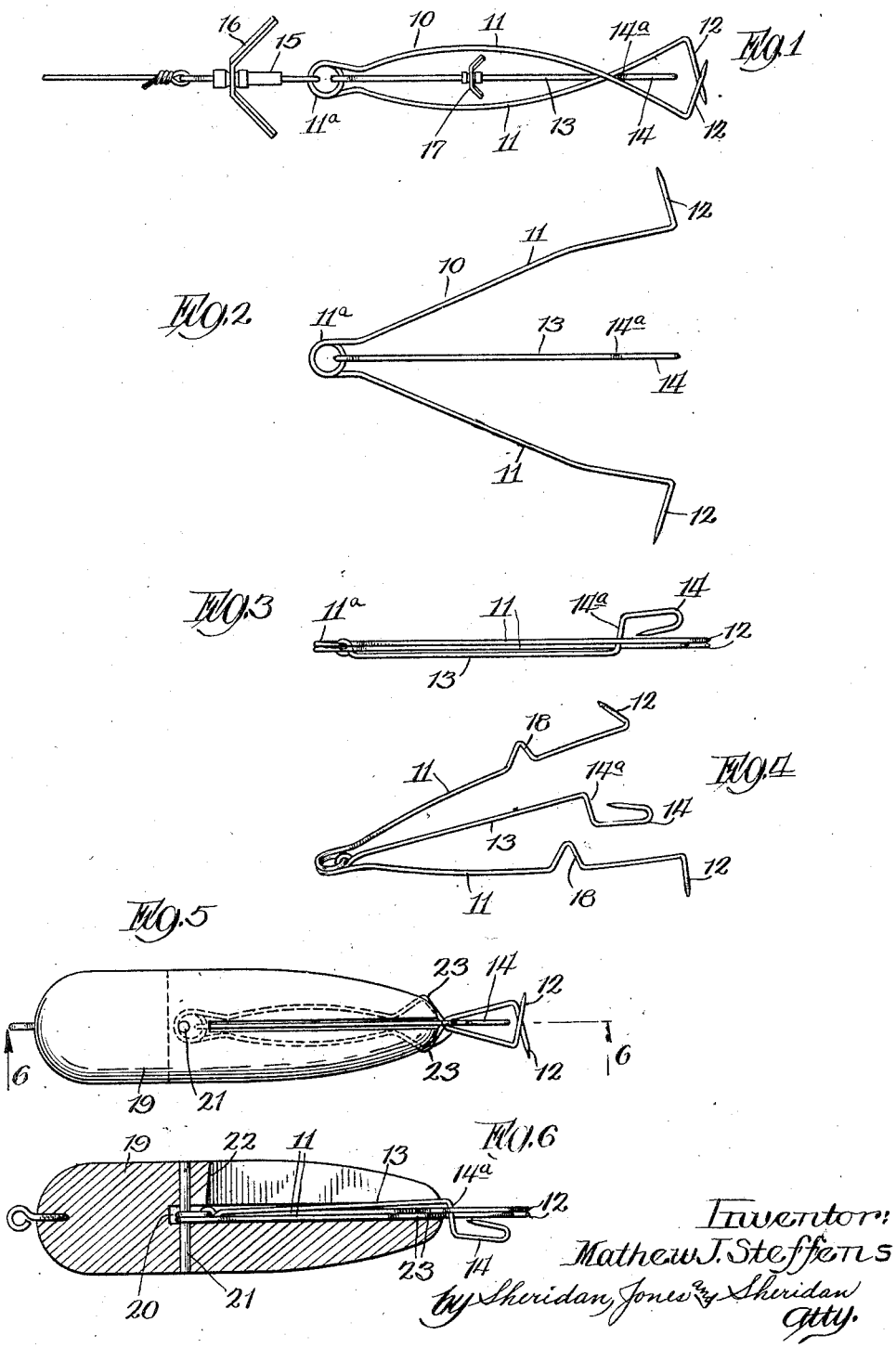

1,649,140

UNITED STATES PATENT OFFICE.

MATHEW JOSEPH STEFFENS, OF CHICAGO, ILLINOIS.

FISHHOOK.

Application filed May 24, 1923. Serial No. 641,039.

This invention relates to improvements in fish hooks and has for its object to provide a fish hook having a pair of spring actuated hook members, which may be set by the user in such manner that when seized by a fish, they will be forcefully driven into some part of the fish's mouth.

Another object of the invention is to provide such an article, the hook members of which when set will be in such a position that they will not engage or become tangled with weeds or other obstacles in the water.

A further object is to provide a hook having spring actuated hook members which may be locked in set position with more or less sensitiveness requiring less or more force respectively to trip the locking means thereby releasing the said hook members.

Other objects relate to features of arrangement and construction of parts which will appear more fully hereinafter, taken in connection with the accompanying drawings, in which Figure 1 shows a plan view of my hook in set position;

Fig. 2 shows a plan view of the hook in unset position;

Fig. 3 is a side view of my invention in set position;

Fig. 4 is a view in perspective of a modification of my invention;

Fig. 5 is a plan view of my invention, applied to an artificial minnow for bait; and Fig. 6 is a vertical sectional view taken on the line 6—6 of Fig. 5.

Similar reference characters are used to designate like elements throughout the drawings in which 10 represents generally stiff steel wire, of great resiliency, which is bent to form a coil 11$^a$ in the central portion and having arms 11 which terminate in pointed hook members 12, as shown in Fig. 1. Attached to the coil 11$^a$ is a trigger member 13, bent at its free end to form a locking member 14, as shown clearly in Fig. 3. In use the hook is secured to a swivel 15, which may carry a spinner 16, or the like. In setting the hook the user compresses the arms 11 until they are crossed, as shown in the Figure 1, after which the trigger member 13 is pushed upwardly so that the locking portion 14 thereof acts as a key between the arm members 11 and prevents the same from springing outwardly under the action of coil 11$^a$ to the position shown in Fig. 2. While in set position it will be seen that as the hook is drawn through the water the points of the hook member 12 will be protected from obstacles in the water, such as stones and the like, and also that they will be weedless.

It will be obvious that if the locking portion 14 of the trigger 13 is pressed upwardly from engagement with the arms 11, as shown by dotted lines in Fig. 3, the arms 11, under the action of coil 11$^a$ and of their own resiliency, will spring violently apart. In use this action occurs when a fish seizes the hook, the portions 12 thereof being driven into the fish. It is desirable to have the portion 14$^a$ of the locking member 14 form an angle slightly greater than a right angle with the trigger 13. The purport of this construction is that the hook may be set with a variable degree of sensitiveness. By depressing locking portion 14 between the crossed arms 11, just sufficiently to retain the same, a very sensitive set is attained whereas if the said portion is fully depressed into locking position, more force will be required to trip the same to cause the hooks to spring apart. Bait may be secured to the locking portion 14, or artificial bait alone may be used as the fisherman desires. If desired, a spinner or other artificial attraction 17 may be attached to the trigger member 13, as shown in Fig. 1.

In Fig. 4 I have shown a modification of the invention shown in Figs. 1 to 3 inclusive, which modification consists in forming finger holding portions 18 in the arms 11 for assistance in setting the hook. These portions will preferably be formed at an angle of about 90° to the plane determined by the arms 11 and the hook members 12, and will prevent the hook from turning in the hands of the user while setting the same, as will be clear.

In Figs. 5 and 6 I have shown a further modification of my invention, which consists in applying a form of the hook previously described in an artificial bait such as wooden minnow, as shown in Fig. 6 to permit the movement of the trigger member 13 to and from set or locking position. With the form of hook used with a minnow, as just described, it is desirable to form finger engaging portions 23 in the arms 11 thereof, which portions will lie in the plane determined by the arms 11 and hook portions 12. These finger portions 23 are large enough to slightly extend beyond the surface of a minnow 19 when in set position, as shown in Fig. 5, to assist in sufficiently compressing the arms 11 so that portion 14 of trigger 13 may be pushed into locking position therebetween.

In this modification, as in the forms previously described, it will be seen that if a fish bites on a rear portion of the minnow, it will force locking portion 14 upwardly as seen in Fig. 6, and thereby release the spring arms 11, which may move laterally through slot 20. Slot 22 provides room for such necessary upward movement of the trigger member 13.

As will be obvious to those skilled in the art, various modifications may be made in the invention I have herein disclosed and described, and I do not wish to be restricted to the particular forms therein shown, except where limitations thereto appear in the following claims.

What I claim is—

1. A device of the class described comprising a pair of arms, a coil integral with one end of each of said arms tending to urge the free ends of said arms outwardly, said free ends being bent outwardly to form hooks; said arms being movable to set position in which position said arms intersect and in which each hook is protected from engagement with weeds or the like by the bent portion of the other arm, and a trigger member for releasably holding said arms in set position, said trigger being secured to said coil and having a bent portion adapted to contact with said arms between the intersection thereof and said hooks, said trigger terminating at its free end adjacent said hooks when in set position, whereby the same will be actuated to releasing position by a fish seizing said hooks.

2. A device of the class described comprising an artificial bait having a pair of slots therein at right angles to each other, a pair of arms secured in one of said slots, a coil integral with one end of each of said arms tending to urge the free ends thereof outwardly, said free ends being bent outwardly to form hooks, said arms being movable against the force of said coil to set position in which position said arms intersect and in which each hook is protected from engagement with weeds or the like by the bent portion of the other arm, and a trigger secured to said coil and movable in said other slot and having a portion adapted to engage said arms between the intersection thereof and said hooks to releasably hold the same in set relation.

In testimony whereof, I have subscribed my name.

MATHEW JOSEPH STEFFENS.